(12) United States Patent
Hsia

(10) Patent No.: US 7,701,275 B2
(45) Date of Patent: Apr. 20, 2010

(54) TIME-LIMITING PROTECTION AND CONTROL CIRCUIT FOR PROTECTING AN ELEMENT BY LIMITING A PULSE WIDTH OF AN INPUT PULSE

(75) Inventor: Wen-Nan Hsia, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 876 days.

(21) Appl. No.: 11/532,538

(22) Filed: Sep. 17, 2006

(65) Prior Publication Data

US 2007/0296484 A1    Dec. 27, 2007

(30) Foreign Application Priority Data

Jun. 22, 2006    (TW) .............................. 95122562 A

(51) Int. Cl.
*H03K 3/017* (2006.01)
(52) U.S. Cl. ....................................... 327/176; 327/172
(58) Field of Classification Search ......... 327/171–173, 327/176, 178
See application file for complete search history.

(56) References Cited

U.S. PATENT DOCUMENTS

| | | | | |
|---|---|---|---|---|
| 5,498,989 A * | 3/1996 | Diba | ........................... | 327/230 |
| 6,346,841 B2 * | 2/2002 | Kim | ........................... | 327/172 |
| 6,492,848 B1 * | 12/2002 | Lee | ........................... | 327/143 |
| 7,236,038 B2 * | 6/2007 | Wu | ........................... | 327/291 |

FOREIGN PATENT DOCUMENTS

TW    447190    7/2001

\* cited by examiner

*Primary Examiner*—Hai L Nguyen
(74) *Attorney, Agent, or Firm*—Winston Hsu

(57) ABSTRACT

A time limiter protects a light emitting diode coupled to an output of a current driver by preventing the light emitting diode from working overtime under a high current and from being overheated and burnt down, no matter whether a pulse width of an input pulse is larger or shorter than a delay time of the time limiter. The input pulse may be a periodic continuous input pulse, or a continuously-enabled pulse generated from a run-time error of software or hardware. The time limiter should be coupled with a discharging circuit for discharging the capacitor in the RC circuit while a periodic continuous input pulse was inputted, to keep the precise original pulse period and pulse width of the enabling signal to be outputted, and to prevent the time limiter from malfunctioning.

5 Claims, 17 Drawing Sheets

TIME-LIMITING PROTECTION AND CONTROL CIRCUIT FOR PROTECTING AN ELEMENT BY LIMITING A PULSE WIDTH OF AN INPUT PULSE

BACKGROUND OF THE INVENTION

1. Field of the Invention

The present invention relates to a time-limiting protection and control circuit, and more particularly, to a time-limiting protection and control circuit for protecting an element by limiting a pulse width of an input pulse.

2. Description of the Prior Art

A specification of a conventional electronic product having light emitting diodes is usually defined in detail for introducing properties of the light emitting diodes well. Please refer to FIG. 1, which is a diagram of a curve relating to a forward current and a relative luminosity of a light emitting diode of an electronic product having a flashlight. As shown in FIG. 1, when an ambient temperature of the electronic product is 25° C., the curve relating to the forward current and the relative luminosity gradually rises, so as determine a rated continuous forward current, which is about 30 mA as shown in FIG. 1, of the light emitting diode, and for determining a maximal current, which is about 100 mA as shown in FIG. 1, of reaching a maximal luminosity. The rated continuous forward currents and the maximal currents of different light emitting diodes also differ. Take the light emitting diode described in FIG. 1 as an example, when the light emitting diode continuously luminesces in an intermediate degree for lighting up an electric light or a flashlight of a camera, the light emitting diode is biased with the rated continuous forward current or a smaller current instead of being biased with the maximal current. When the light emitting diode luminesces in a high degree, such as for lighting up a flashlight of a camera, the light emitting diode is biased with the maximal current, which is 100 mA as exemplified in FIG. 1, for reaching a maximal luminance. Please refer to FIG. 2, which is a diagram illustrating a relation between a duty ratio and an allowable forward current of the light emitting diode described in FIG. 1 and biased with the maximal current, for describing properties of a light emitting diode of a flashlight of a camera. As shown in FIG. 2, when the duty ratio of the light emitting diode is below 10%, the light emitting diode may be biased under the maximal current, which is 100 mA as exemplified above. However, when the duty ratio of the light emitting diode is above 10%, with the increase of the duty ratio and the ambient temperature of the light emitting diode, the allowable forward current for biasing the light emitting diode decreases significantly. Please refer to FIG. 3, which is a diagram of an ambient temperature versus an allowable forward current of the light emitting diode described in FIG. 1 while the light emitting diode operates continuously, for describing operating properties of the light emitting diode utilized for an electric light. As shown in FIG. 3, when the ambient temperature of the light emitting diode is below 25° C., a maximal allowable forward current of the light emitting diode is 30 mA. However, when the ambient temperature of the light emitting diode is above 25° C., the maximal allowable forward current of the light emitting diode decreases continuously. As a constant-current driving integrated circuit of an electronic device continuously provides a forward current for the light emitting diode, the ambient temperature of the light emitting diode increases accordingly. When the ambient temperature of the light emitting diode is above 85° C., as shown in FIG. 3, the light emitting diode burns down so that the electronic device malfunctions.

Please refer to FIG. 4 and FIG. 5. FIG. 4 is a diagram of a control integrated circuit having single function. The control integrated circuit shown in FIG. 4 may be utilized for a flashlight of a camera or an electric light of a cell phone. Through single current, the control integrated circuit may be utilized for managing a forward current of a light emitting diode, which is designed to be operated continuously or is required to manipulate a length of an operation time with a duty ratio. FIG. 5 is a diagram of a control integrated circuit having two functions. The control integrated circuit shown in FIG. 5 has two enabling terminals for simultaneously manipulating a duty ratio of a light emitting diode of a flashlight of a camera and a switch-on function of an electric light of a cell phone. Therefore, the control integrated circuit provides different currents at the same time for both the light emitting diodes biased for different usages. Both the control integrated circuits shown in FIG. 4 and FIG. 5 determine respective forward currents by enabling. However, when a corresponding microprocessor or a corresponding central processing of a control integrated circuit malfunctions or has certain executing errors so that an enabling signal of the control integrated circuit is continuously enabled, light emitting diodes of the control integrated circuit would be easily burnt down, as described in FIG. 3. Moreover, conventional mechanisms including an over current protection (OCP) and an over temperature protection (OTP) utilized for such control integrated circuits are not able to provide in-time and efficient protection for light emitting diodes.

SUMMARY OF THE INVENTION

A time-limiting protection and control circuit for protecting an element by limiting a pulse width of an input pulse comprises an exclusive-OR gate having a first input terminal and a second input terminal, a delay circuit having a first terminal coupled to the first input terminal of the exclusive-OR gate, and a second terminal coupled to the second input terminal of the exclusive-OR gate, and a discharging circuit having a first terminal coupled to the input terminal of the delay circuit, and having a second terminal coupled to the second input terminal of the exclusive-OR gate.

These and other objectives of the present invention will no doubt become obvious to those of ordinary skill in the art after reading the following detailed description of the preferred embodiment that is illustrated in the various figures and drawings.

DETAILED DESCRIPTION

For sake of preventing a light emitting diode from being burnt down caused by being overheated, when the light emitting diode is over-activated, or when a related control circuit malfunctions to provide an enabling signal continuously, a time-limiting protection and control circuit is provided in the present invention for manipulating a duty ratio of the light emitting diode with an input pulse having a limited pulse width. Therefore, the light emitting diode would not be activated for a long time, and not be burnt down by being overheated. That is, in the present invention, when a pulse width of an input pulse is shorter than a predetermined pulse width, the pulse width and a period of the input pulse are kept; and when the pulse width of the input pulse is longer than the predetermined pulse width, the pulse width of the input pulse is limited by the predetermined pulse width.

Figure 4:
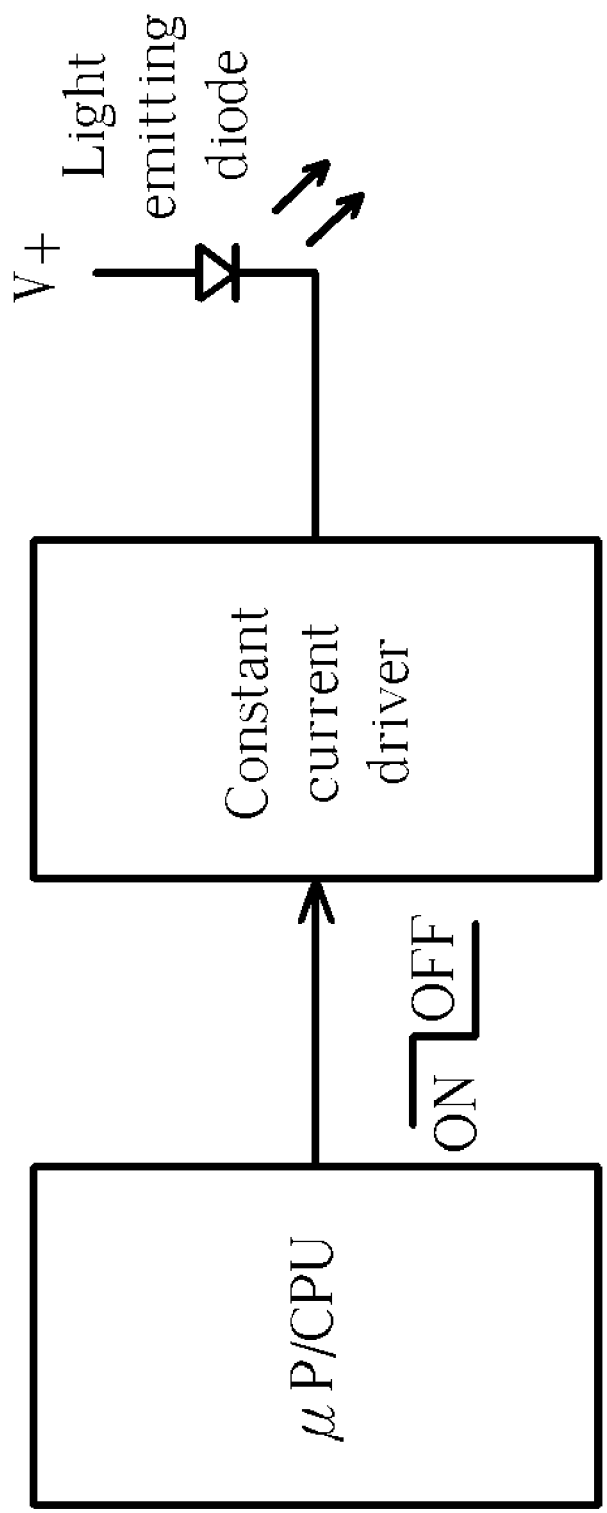
FIG. 4 is a diagram of a control integrated circuit having single function.
Figure 5:
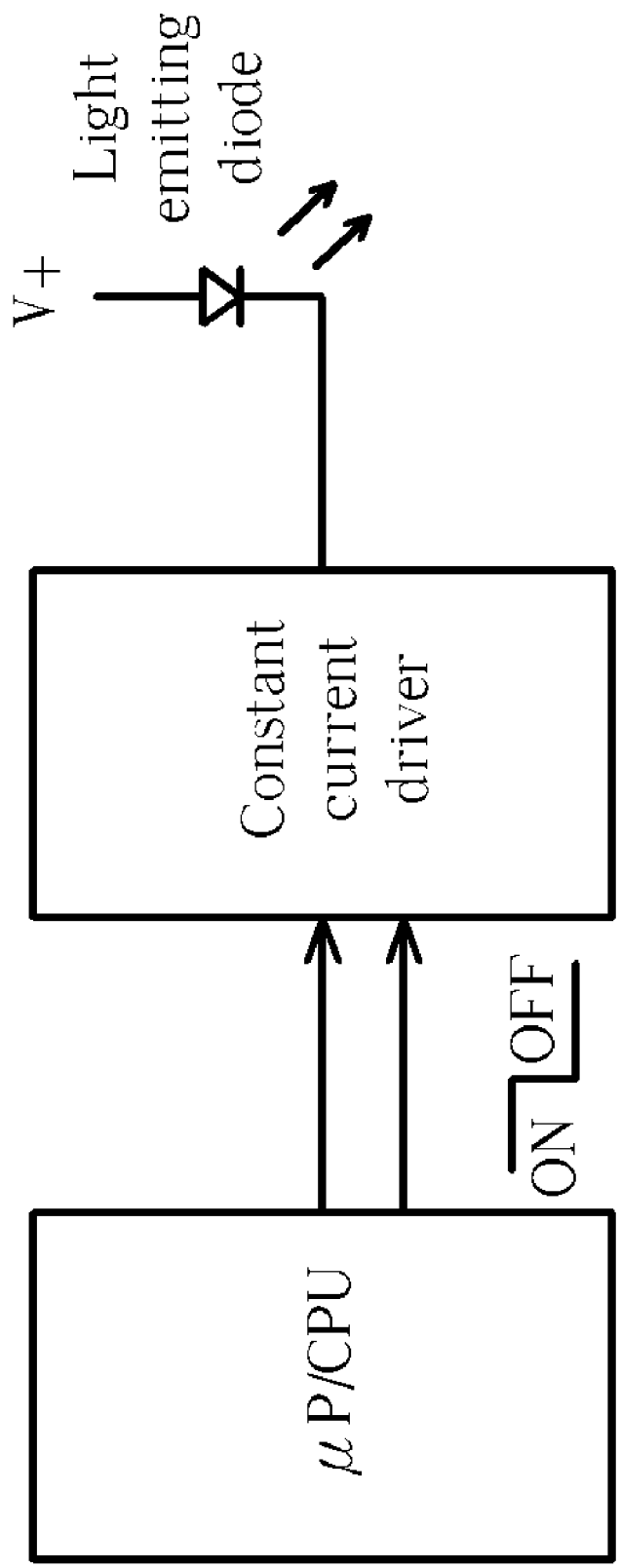
FIG. 5 is a diagram of a control integrated circuit having two functions.
Figure 6:
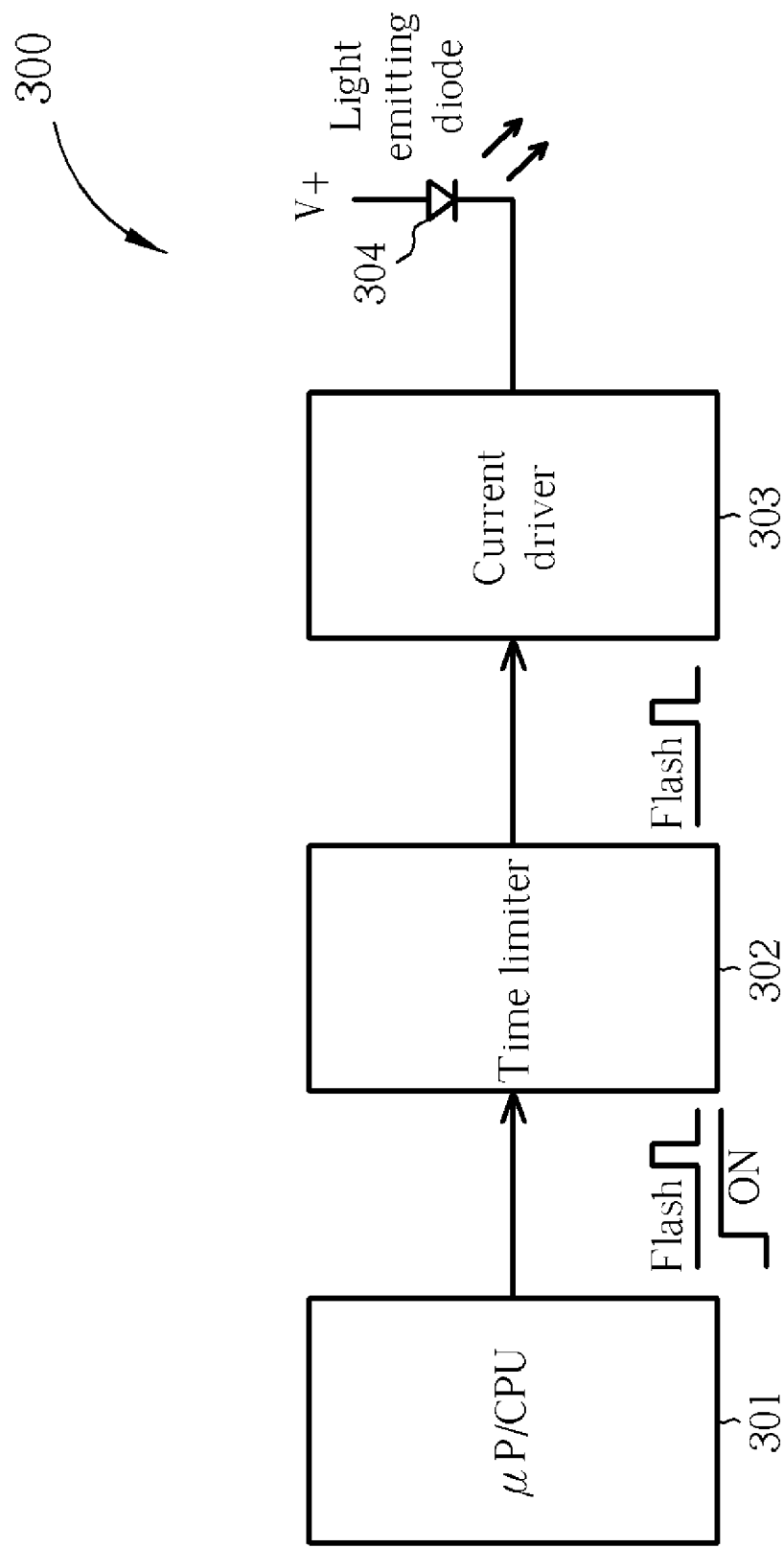
FIG. 6 is a block diagram of a time-limiting protection circuit of the present invention.

Please refer to FIG. 6, which is a block diagram of a time-limiting protection circuit 300 of the present invention. As shown in FIG. 6, the time-limiting protection circuit 300 comprises a processor 301, a time limiter 302, coupled to an output terminal of the processor 301, a current driver 303, coupled to an output terminal of the time limiter 302, and a light emitting diode 304, coupled to an output terminal of the current driver 303. The processor 301 is the same with the processors shown in FIG. 4 and FIG. 5. The current driver 303 is also the same with the current drivers shown in FIG. 4 and FIG. 5. Therefore, the time-limiting protection and control circuit 300 mainly differs with the current drivers shown in FIG. 4 and FIG. 5 in the time limiter 302. The time limiter 302 is for transforming an input signal from the processor 301 into a pulse having an adequate pulse width. The input signal from the processor 301 may be a continuous signal described in FIG. 4 or be a pulse described in FIG. 5. The adequate pulse width relates to properties of various light emitting diode module, for example, with respect to a light emitting diode module having a better heat-radiating ability, a pulse width of a pulse transformed from the time limiter 302 may be longer. With a well-determined pulse width, the light emitting diode may be prevented from being overheated or even burnt down, which happens when an ambient temperature of the light emitting diode is higher than a threshold.

Figure 7:
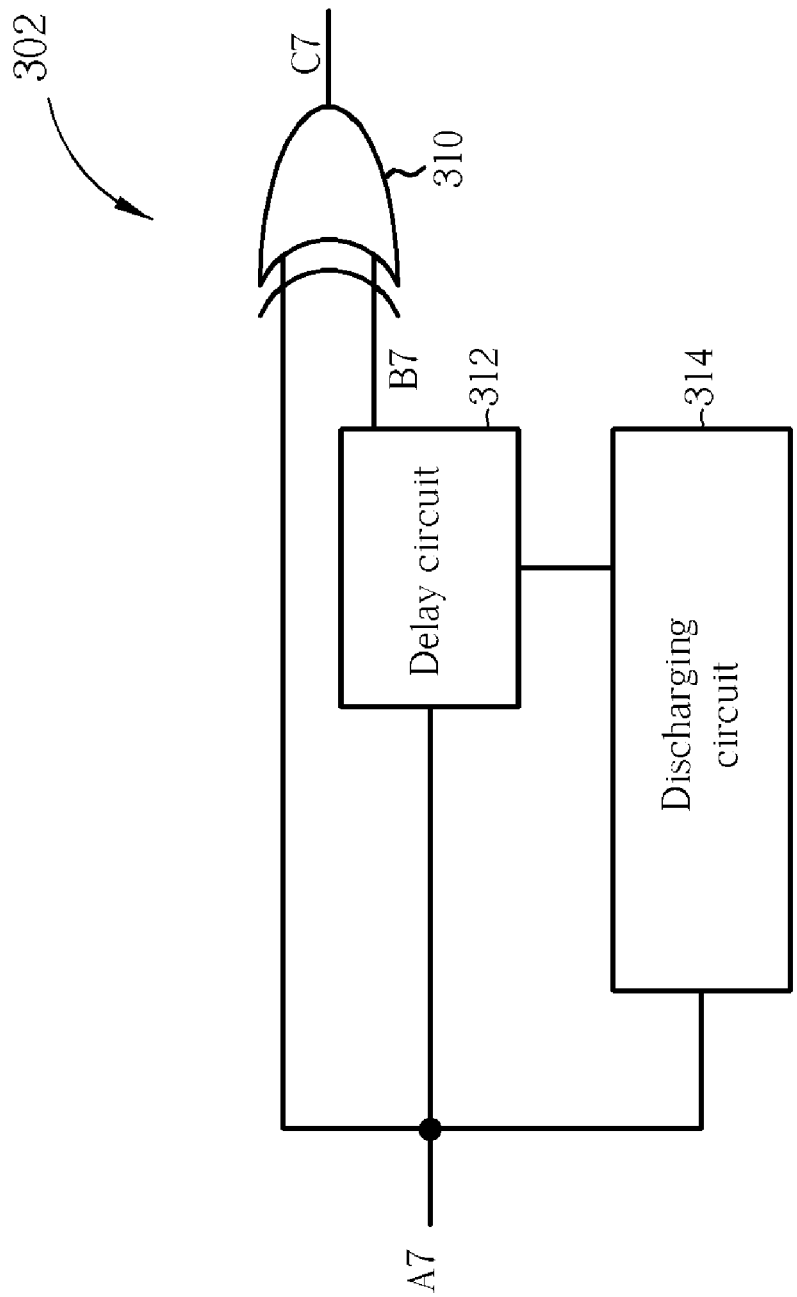
FIG. 7 is a block diagram of the time limiter shown in FIG. 6.

Please refer to FIG. 7, which is a block diagram of the time limiter 302 shown in FIG. 6. As shown in FIG. 7, the time limiter 302 comprises an exclusive-OR gate 310, a delay circuit 312, and a discharging circuit 314. The exclusive-OR gate 310 has a first input terminal and a second input terminal. A first terminal of the delay circuit 312 is coupled to the first input terminal of the exclusive-OR gate 310, and a second terminal of the delay circuit 312 is coupled to the second input terminal of the exclusive-OR gate 310. The discharging circuit 314 has a first terminal coupled to a third terminal of the delay circuit 312, and a second terminal coupled to the second input terminal of the exclusive-OR gate 310. The input signal from the processor 301 is inputted to the time limiter 302 through a node A7, which is shown in FIG. 7 and is coupled to the second terminal of the delay circuit 312, the second input terminal of the excusive-OR gate 310, and the second terminal of the discharging circuit 314. Moreover, since the discharging circuit 314 is operated according to a voltage level of the node A7, thereby, the discharging circuit 314 is also a node-detection discharging circuit.

Figure 8:
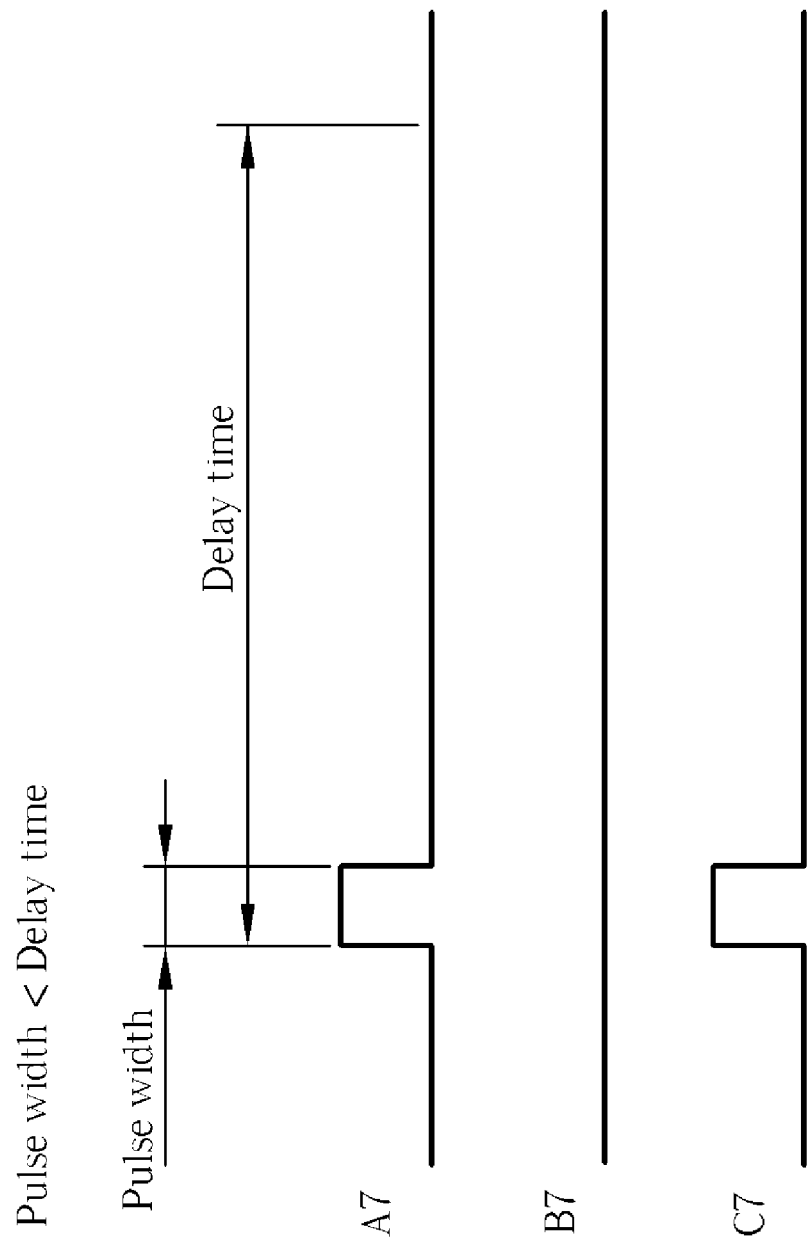
FIG. 8 is a diagram of voltage levels of all nodes of the time limiter shown in FIG. 7 when a pulse width of an input pulse is shorter than a delay time of a delay circuit.

Please refer to FIG. 8, and refer to FIG. 7 again. FIG. 8 is a diagram of voltage levels of all nodes of the time limiter 302 shown in FIG. 7 when a pulse width tp of an input pulse is shorter than a delay time td of the delay circuit 312. When the input pulse is inputted at the node A7 shown in FIG. 7, since the delay time td of the delay circuit 312 is longer than the pulse width tp of the input pulse, thereby, the voltage level of a node B7 shown in FIG. 7 is low. Through operations of the exclusive-OR gate 310, a waveform of a node C7 shown in FIG. 7 has an extremely small phase difference with a waveform of the node A7, and the phase difference is almost negligible so that the waveforms of the nodes A7 and C7 may be regarded as in phase. That is, the enabling pulse generated at the node C7 has a same pulse width as the pulse width of the input pulse at the node A7, thereby, the pulse width of the enabling pulse generated at the node C7 can be limited by the pulse width of the input pulse at the node A7. In summary, as long as the pulse width of the input pulse is under proper control, a duty ratio of the light emitting diode 304 would not be too long to have the light emitting diode 304 burnt down when the pulse width of the input pulse is shorter than the delay time of the delay circuit 312. The aim of protecting the light emitting diode 304 in the present invention is thus achieved.

Figure 9:
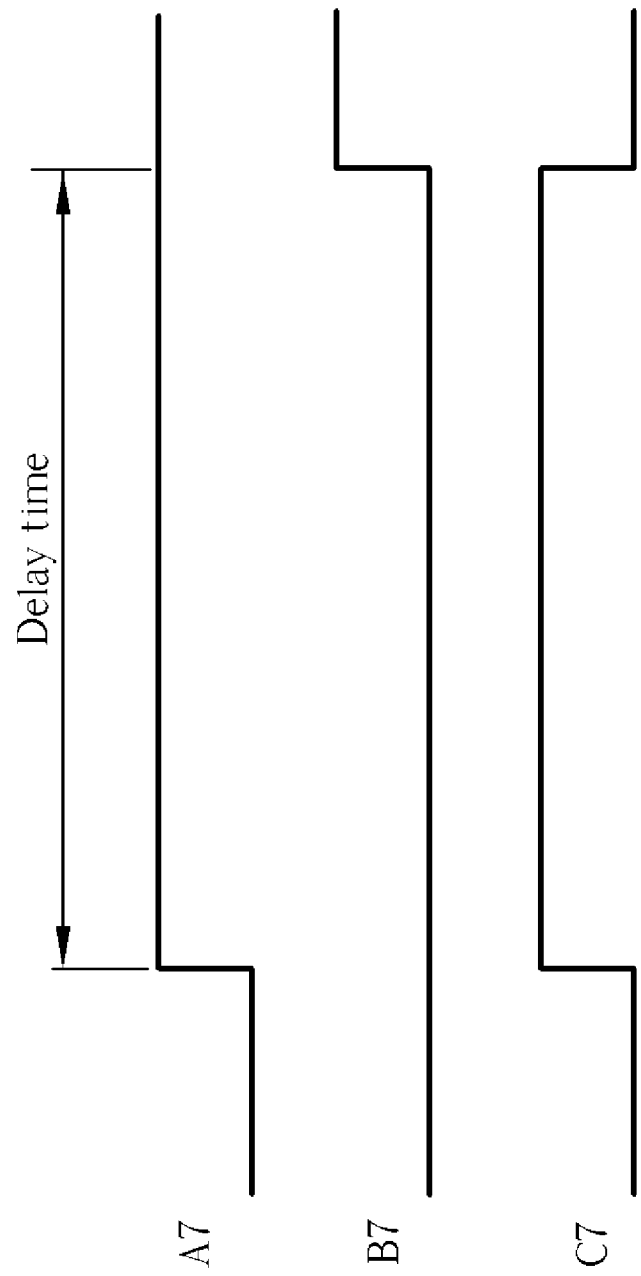
FIG. 9 is a waveform diagram of each node of the time limiter shown in FIG. 7 when a pulse width of an input pulse is larger than a delay time of the delay circuit.

Please refer to FIG. 9, and refer to FIG. 7 again. FIG. 9 is a waveform diagram of each node of the time limiter 302 shown in FIG. 7 when a pulse width of an input pulse is larger than a delay time of the delay circuit 312. After an input pulse is inputted at the node A7 shown in FIG. 9, since the delay time of the delay circuit 312 is smaller than the pulse width of the input pulse, thereby, an enabling pulse is generated at the node B7 before the input pulse at the node A7 ceases to exist and when the delay time of the delay circuit is over. By observing the waveform at the node B7 before the delay time of the delay circuit is over, a waveform at the node C7 before the delay time ends is the similar to the waveform at the node A7 shown in FIG. 8. By observing the waveform at the node B7 before the delay time ends and before the enabled input pulse ceases to exist, through operations of the exclusive-OR gate 310, an enabling pulse at the node C7 is disabled after the delay time ends. That is, a duty ratio of the light emitting diode 304 is limited by the delay time of the delay circuit 312. Therefore, as long as the delay time of the delay circuit 312 is properly controlled, the duty ratio of the light emitting diode 304 would be effectively manipulated when the pulse width of the input pulse at the node A7 is shorter than the delay time of the delay circuit 312. The duty ratio of the light emitting diode 304 is thus properly manipulated and the light emitting diode 304 is prevented from being burnt down. The aim of protecting the light emitting diode 304 in the present invention is thus achieved.

Figure 10:
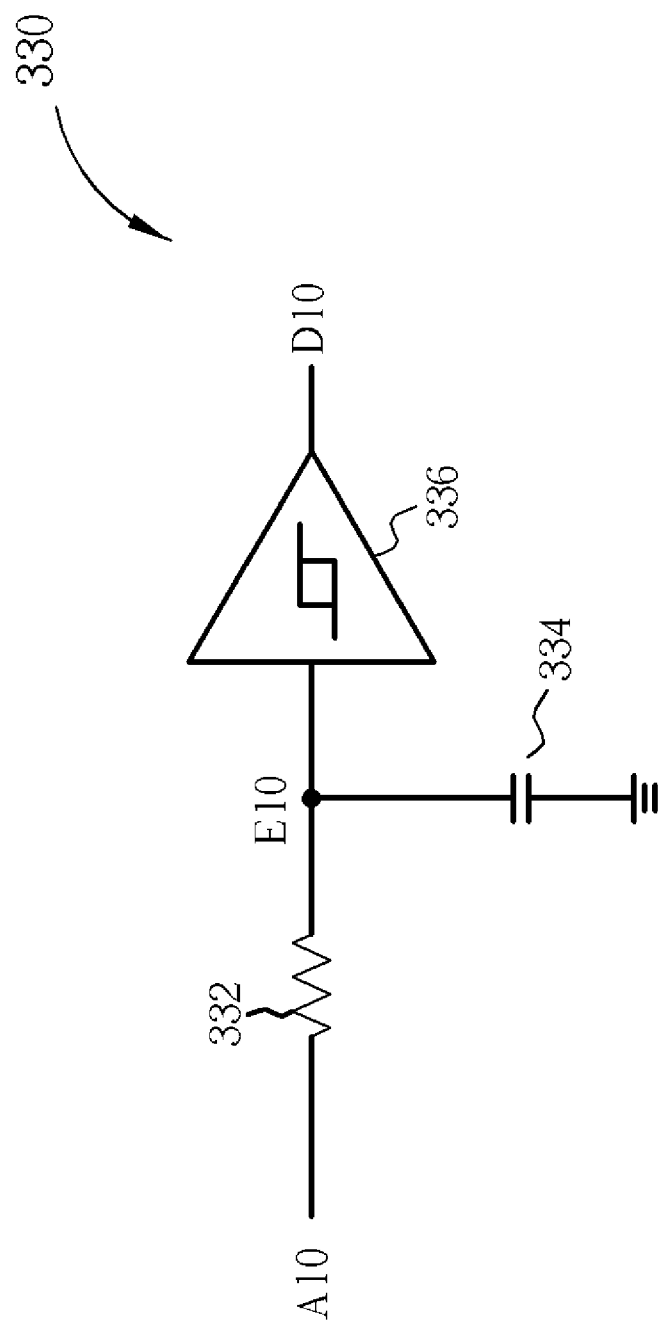
FIG. 10 is a diagram of a delay circuit according to a simplified embodiment of the delay circuit shown in FIG. 7.
Figure 11:
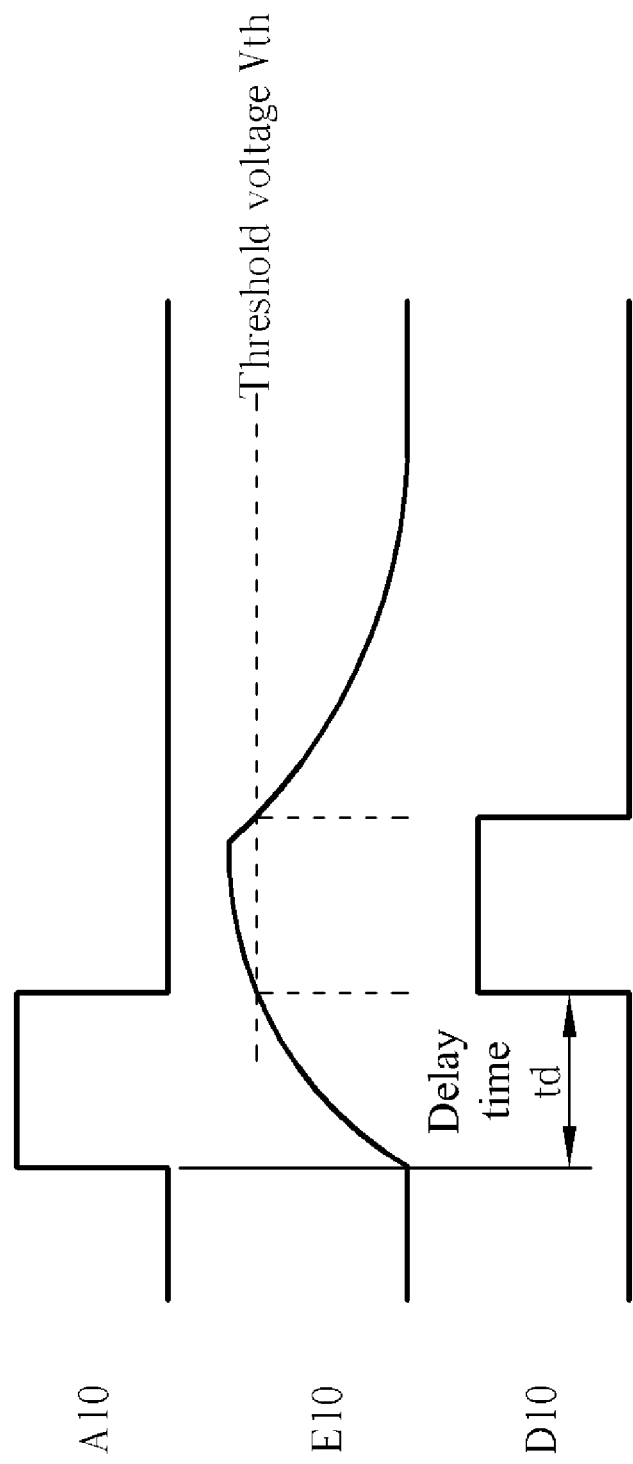
FIG. 11 is a waveform diagram of each node of the delay circuit shown in FIG. 10.

Please refer to FIG. 10 and FIG. 11. FIG. 10 is a diagram of a delay circuit 330 according to a simplified embodiment of the delay circuit 312 shown in FIG. 7. FIG. 11 is a waveform diagram of each node of the delay circuit 330 shown in FIG. 10. As shown in FIG. 10, the delay circuit 330 may be a simple RC-circuit, which simply consists of resistors and capacitors. The delay circuit 330 comprises a resistor 332, a capacitor 334, and an active high Schmitt trigger 336. The resistor 332 has a first terminal coupled to a first terminal of the capacitor 334, and a second terminal coupled to an input pulse source. The capacitor 334 has the first terminal coupled to the input terminal of the active high Schmitt trigger 336, and a second terminal coupled to ground. In FIG. 10, a node A10 is equivalent to the node A7 shown in FIG. 7, thereby, the waveform of the node A10 is the waveform of the input pulse inputted to the delay circuit 330. A waveform of a node E10 represents a voltage level with respect to the capacitor 334. After inputting an input pulse at the node A10, the capacitor 334 begins to charge so that a voltage level at the node E10 is gradually increased to a threshold of the active high Schmitt trigger 336. In FIG. 11, a delay time td represents a time segment after the input pulse is inputted and before the voltage level at the node E10 exceeds the threshold of the active high Schmitt trigger 336. After the voltage level at the node E10 exceeds the threshold of the active high Schmitt trigger 336, the output pulse generated from the active high Schmitt trigger 336 changes from a low voltage level to a high voltage level. As shown in FIG. 11, after the voltage level at the node E10 exceeds the threshold of the active high Schmitt trigger 336, the input pulse at the node A10 also changes from a high voltage level to a low voltage level, and at the same time, the stored charges of the capacitor 334 are also discharged through the resistor 332 so that the voltage level at the node E10 begins to fall. After the voltage level at the node E10 falls below the threshold of the active high Schmitt trigger 336, the output pulse of the active high Schmitt trigger 336 changes from a high voltage level to a low voltage level, and the waveform at the node D10 also changes from a high voltage level to a low voltage level. From the above descriptions, it is obvious that the waveform at the node D10 is retrieved by delaying the waveform at the node A10 with the delay time td. Moreover, the delay time td of the delay circuit 330 may also be modulated by modulating the resistance of the resistor 332 and the capacitance of the capacitor 334. The delay time td may be denoted as follows:

$$td = E \times Rd \times Cd \quad (1)$$

Figure 1:
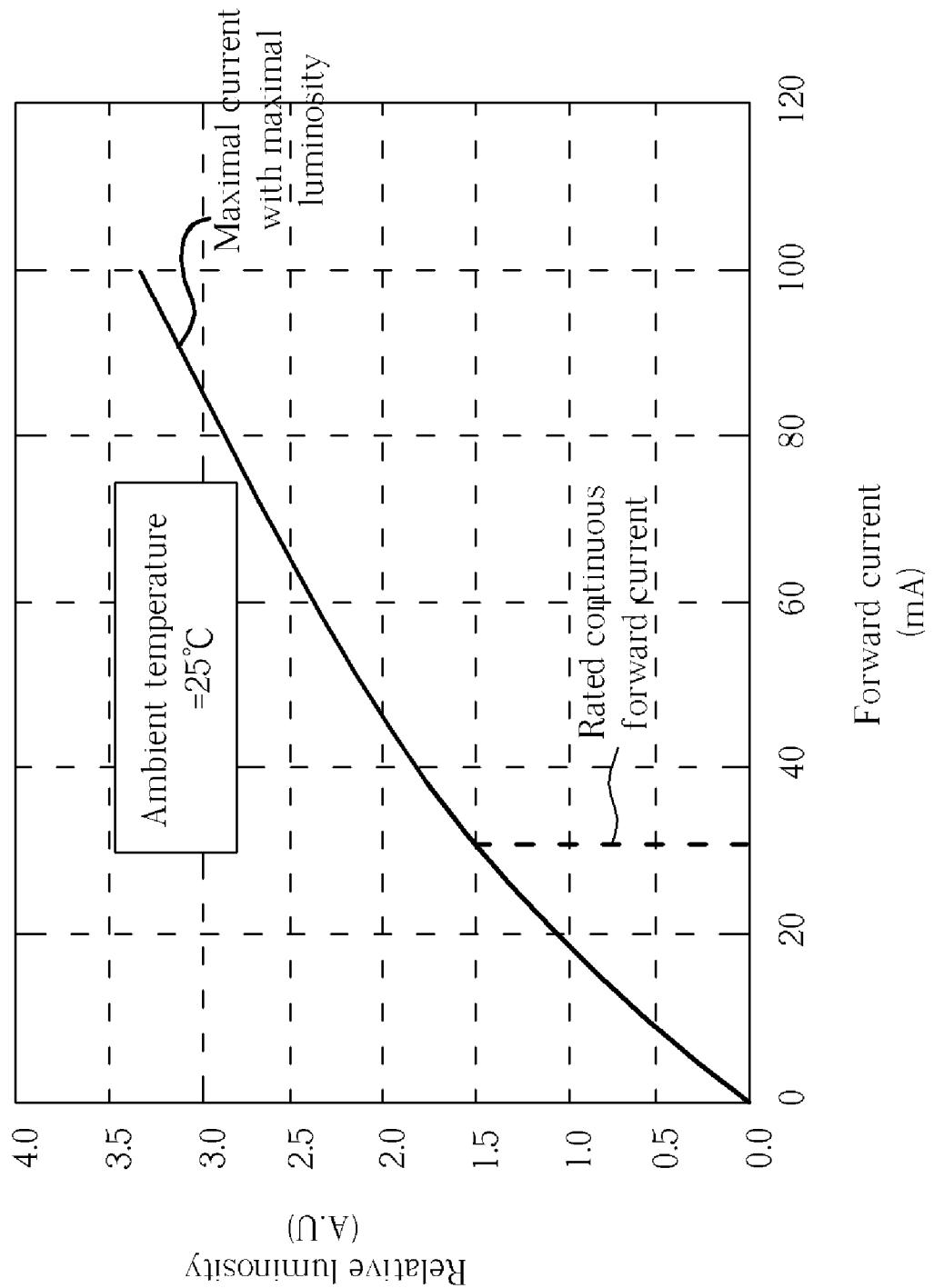
FIG. 1 is a diagram of a curve relating to a forward current and a relative luminosity of a light emitting diode of an electronic product having a flashlight.
Figure 2:
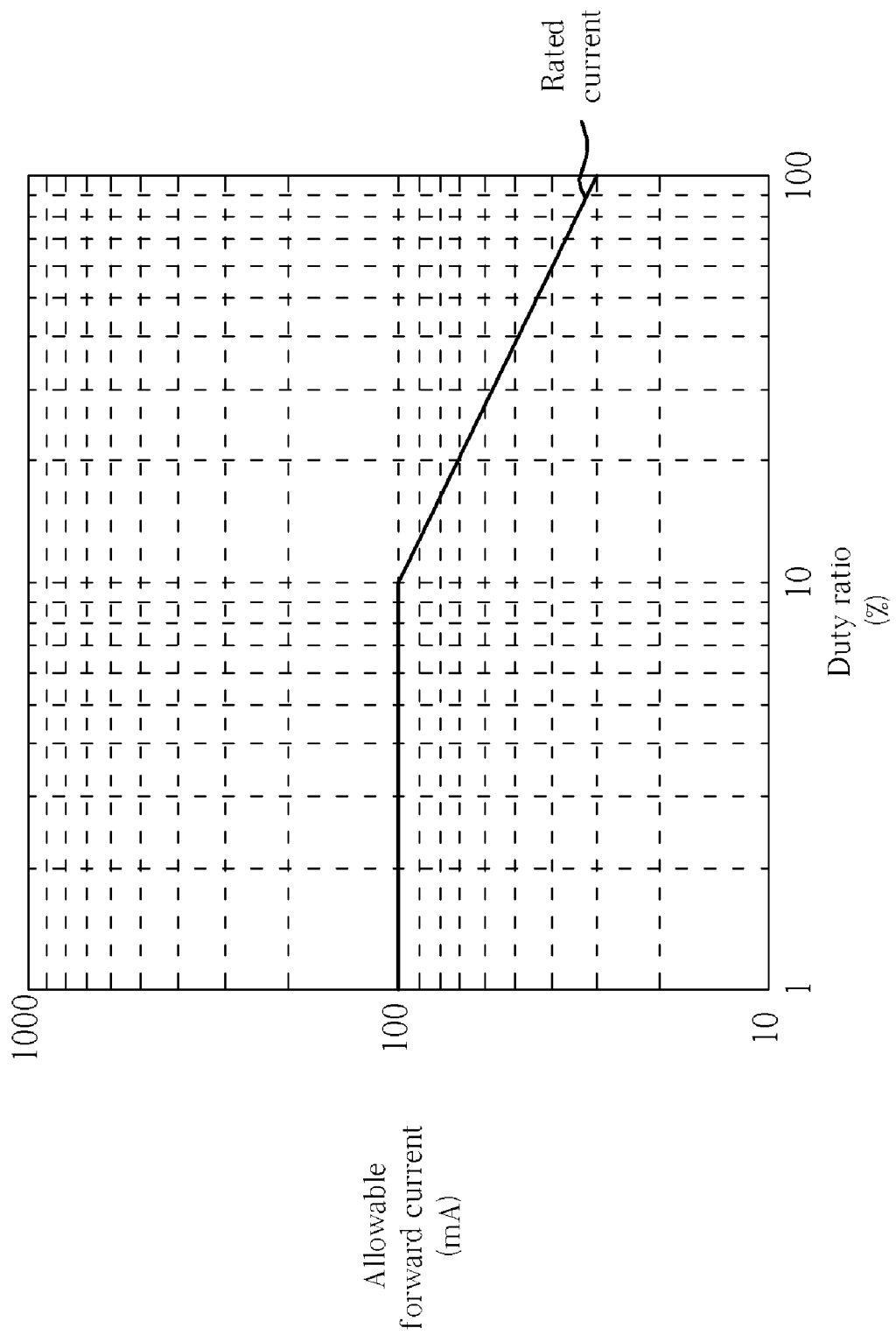
FIG. 2 is a diagram illustrating a relation between a duty ratio and an allowable forward current of the light emitting diode described in FIG. 1 and biased with the maximal current, for describing properties of a light emitting diode of a flashlight of a camera.
Figure 3:
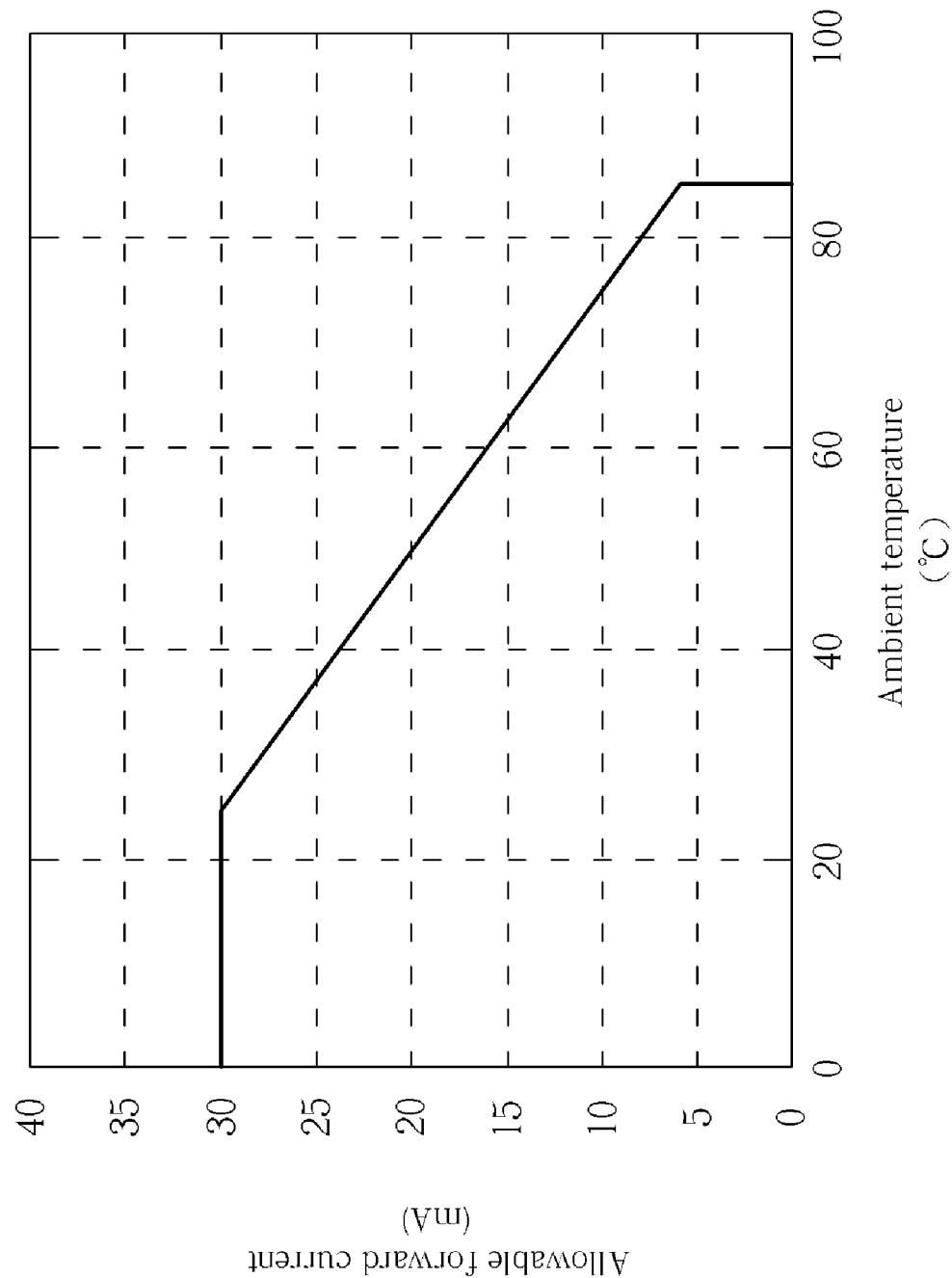
FIG. 3 is a diagram of an ambient temperature versus an allowable forward current of the light emitting diode described in FIG. 1 while the light emitting diode operates continuously, for describing operating properties of the light emitting diode utilized for an electric light.

E denotes a related parameter, which is associated with properties of an integrated circuit having the delay circuit 330. Rd denotes the resistance of the resistor 332. Cd denotes the capacitance of the capacitor 334. By modulating the length of the delay time td, the delay circuit 330 may be utilized for a flashlight having a short pulse width or for an electric light having a long pulse width. According to the properties of a light emitting diode mentioned in FIG. 1, FIG. 2, and FIG. 3, modulating the length of the delay time td to a tolerable duty ratio of the light emitting diode according to a corresponding forward current and a corresponding ambient temperature of the light emitting diode may protect the light emitting diode effectively.

Figure 12:
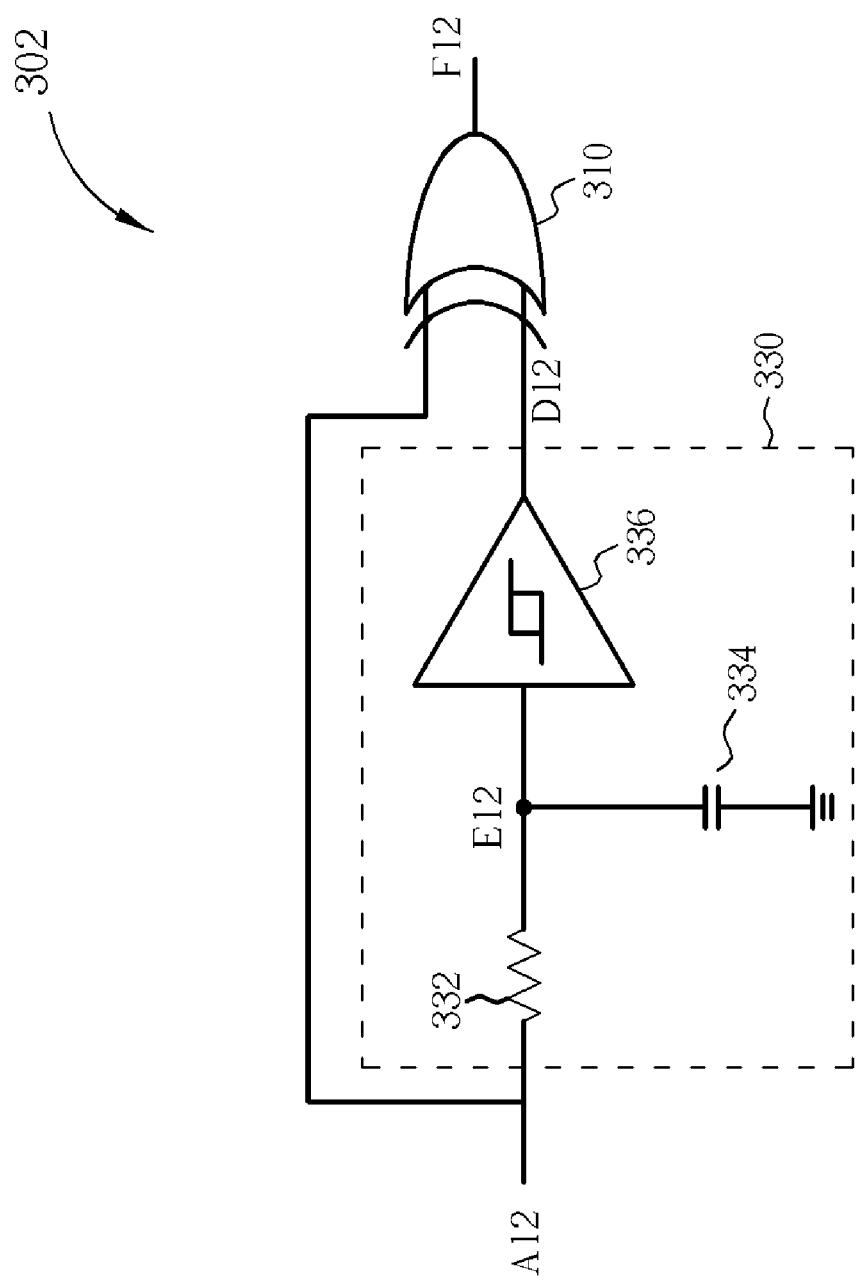
FIG. 12 is a diagram of the time limiter being shown in FIG. 6 and generated by utilizing the delay circuit shown in FIG. 10.

Please refer to FIG. 12. By applying the exclusive-OR gate 310 on the delay circuit 330 shown in FIG. 10, a simplified time-limiting protection and control circuit is thus generated. A waveform at a node F12 is equivalent to the waveform of the node C7 shown in FIG. 7, which has been illustrated in FIG. 8 and FIG. 9. The signal at the node F12 is an enabling signal for controlling the light emitting diode 304. Therefore, by modulating the length of the delay time td as mentioned above, a maximal duty ratio of the light emitting diode 304 may thus be modulated.

Figure 13:
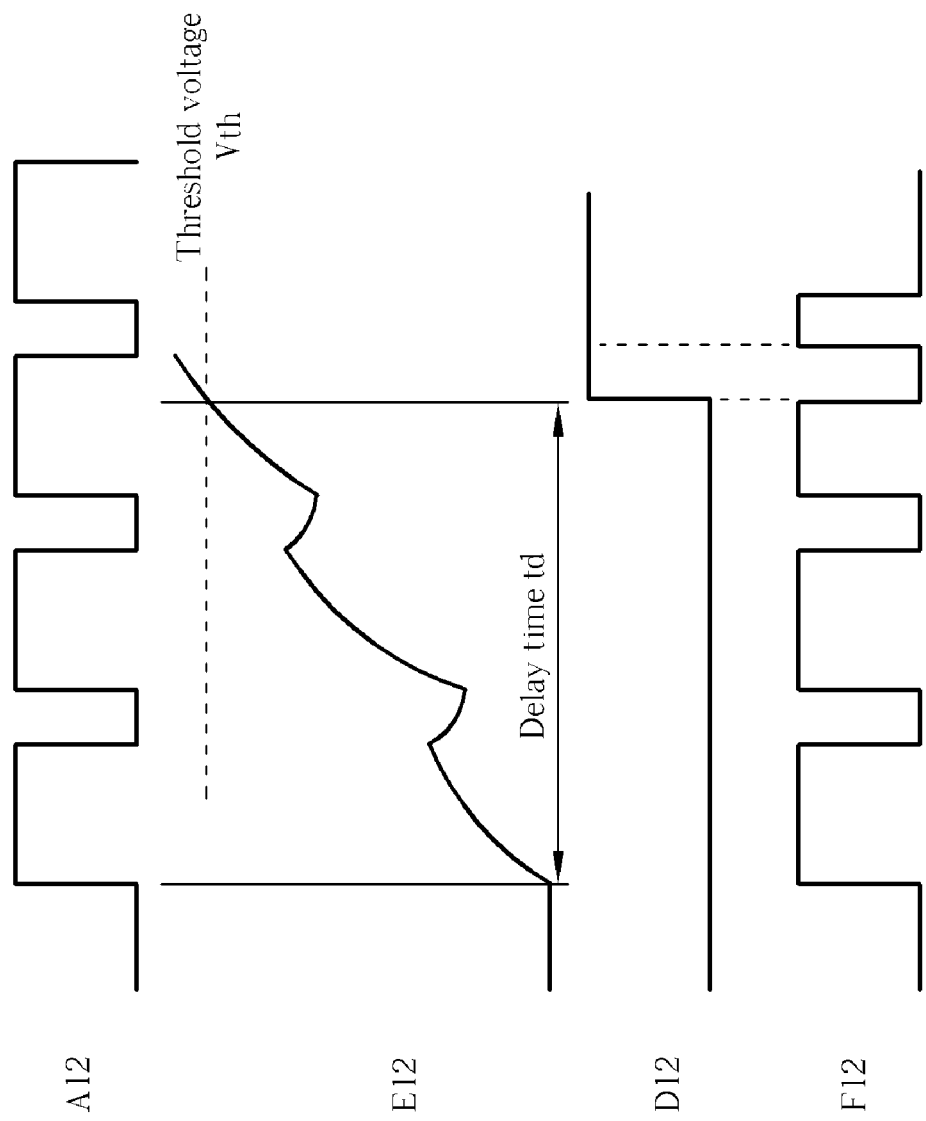
FIG. 13 is a waveform diagram of each node of the time limiter shown in FIG. 12 while inputting a periodic continuous input pulse to the time limiter.

However, there are also defects in the delay circuit 330 shown in FIG. 10. Please refer to FIG. 12 and FIG. 13. FIG. 12 is a diagram of the time limiter 302 being shown in FIG. 6 and generated by utilizing the delay circuit 330 shown in FIG. 10. FIG. 13 is a waveform diagram of each node of the time limiter 302 shown in FIG. 12 while inputting a periodic continuous input pulse to the time limiter 302. As shown in FIG. 12, in the delay circuit 330, an output terminal of the active high Schmitt trigger 336 is coupled to the first input terminal of the exclusive-OR gate 310, and a second terminal of the resistor 332 is coupled to the exclusive-OR gate 310. The output terminal of the exclusive-OR gate 310, which is as described in FIG. 7, is coupled to the output terminal of the current driver 303 shown in FIG. 6, which is coupled to the light emitting diode 304 to be protected for providing an enabling signal to the light emitting diode 304 and manipulating the duty ratio of the light emitting diode 304. Please refer to the descriptions in FIG. 10 and FIG. 11 also, in FIG. 13, a periodic continuous input pulse is inputted to a node A12 shown in FIG. 12. Therefore, in a short while after single input pulse ceases to exist, another input pulse is also inputted at the node A12 so that charges stored in the capacitor 334 with respect to the node E12 are gradually increased to increase a voltage level at the node E12 without completely discharging the stored charges in the capacitor 334. After the voltage level at the node E12 exceeds the threshold of the active high Schmitt trigger 336, since the voltage level at the node E12 is increased continuously by the stored charges of the capacitor 334, thereby, the voltage level at the node E12 is no longer below the threshold of the active high Schmitt trigger 336 when the periodic continuous input pulse is continuously inputted at the node A12. At last, the voltage level of the output of the active high Schmitt trigger 336 at the node D12 is continuously high. Through the operations of the exclusive-OR gate 310, the waveform of a periodic enabling signal outputted at the node F12 would be the inverse of an expected waveform in phase. The phenomenon makes it difficult for the time limiter 302 to be applied to a frequent-emitting flashlight of a camera.

Figure 14:
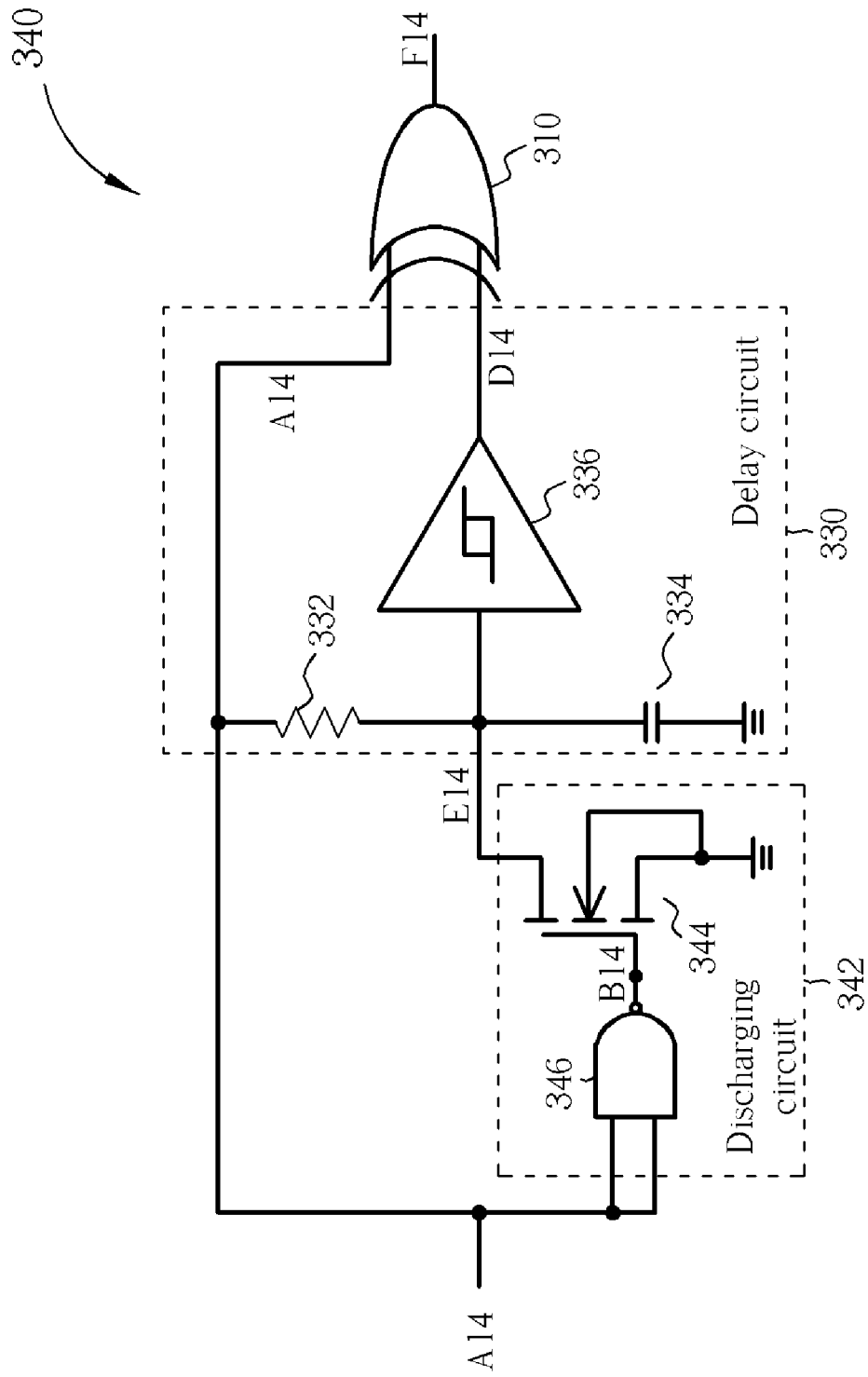
FIG. 14 is a diagram of a time limiter, which is a first improved embodiment of the time limiter shown in FIG. 1 2, according to an embodiment of the present invention.

Considering the situation mentioned above about FIG. 12 and FIG. 13, another two embodiments of the time limiter 302 are provided in the present invention for improving the defects of the delay circuit 330 shown in FIG. 12. Please refer to FIG. 14 and FIG. 12 simultaneously. FIG. 14 is a diagram of a time limiter 340, which is a first improved embodiment of the time limiter 302 shown in FIG. 12, according to an embodiment of the present invention. As shown in FIG. 14, the time limiter 340 comprises all the elements of the delay circuit 330, and further comprises a discharging circuit 342. The time limiter 340 is generated by parallel-connecting the discharging circuit 342 to the resistor 332 between the nodes A12 and E12 in the time limiter 330 shown in FIG. 12. The discharging circuit 342 comprises a transistor 344 and a NAND gate 346. The transistor 344 has a source coupled to ground, a base coupled to the source of the transistor 344, and a drain coupled to the first terminal of the resistor 332, which is at a node E14 shown in FIG. 14. The NAND gate 346 has an output terminal coupled to the gate of the transistor 344, and has a first input terminal and a second input terminal, both of which are coupled to the second terminal of the resistor 332, which is at a node A14 shown in FIG. 14.

Figure 15:
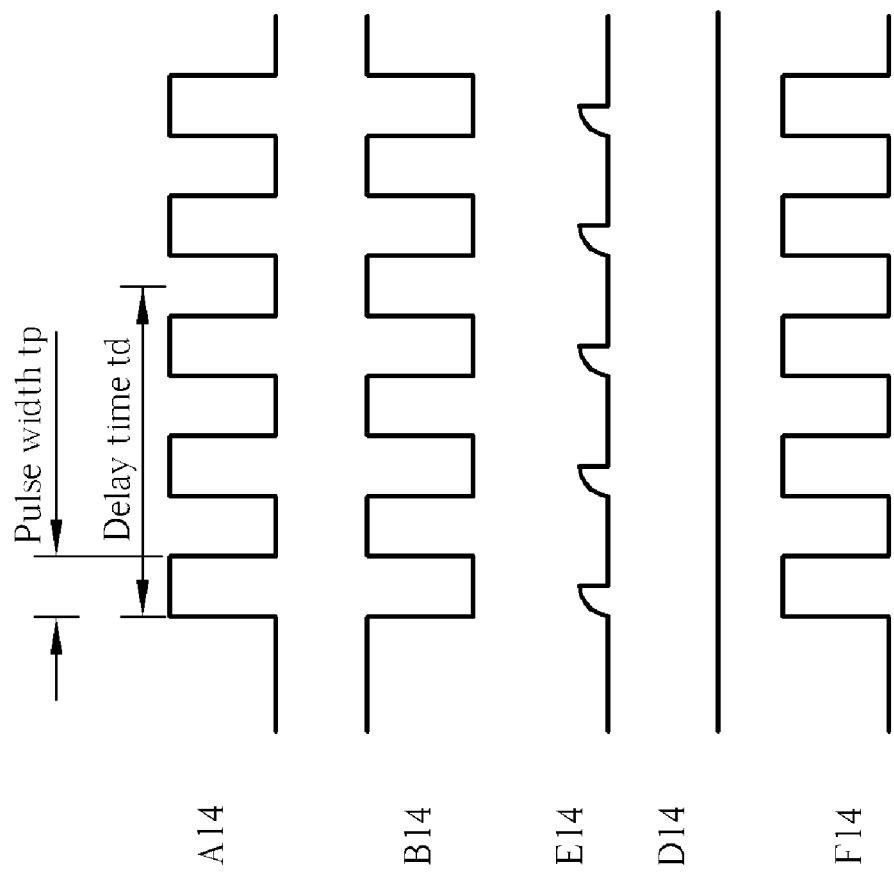
FIG. 15 is a waveform diagram of each node of the time limiter shown in FIG. 14 when a pulse width representing a duty ratio of a periodic continuous input pulse is shorter than the delay time of the delay circuit of the time limiter.

Please refer to FIG. 15, which is a waveform diagram of each node of the time limiter 340 shown in FIG. 14 when a pulse width representing a duty ratio tp of a periodic continuous input pulse is shorter than the delay time td of the delay circuit 330. As shown in FIG. 15, in single period of the periodic continuous input pulse, and during the duty ratio tp of periodic continuous input pulse, a voltage level at a node B14 is low through operations of the NAND gate 346 so that the transistor 344 is turned on. While the capacitor 344 is being charged by the periodic continuous input pulse, the voltage level at a node E14 is gradually increased. However, since the transistor 344 has been turned on, charges stored in the capacitor 334 are discharged through the transistor 344 instead of being accumulated in the capacitor 334. Moreover, the capacitor 334 is not charged in a sufficient time by the periodic continuous input pulse since the duty ratio tp is not long enough, thereby, the voltage level at node E14 would not exceed the threshold of the active high Schmitt trigger 336 so that the active high Schmitt trigger keeps outputting a low voltage-level pulse. A period and a pulse width of an output pulse of the exclusive-OR gate 310 would be the same with the period and the pulse width of the periodic continuous input pulse at the node A14 so that the light emitting diode 304 may emit frequently and periodically.

Figure 16:
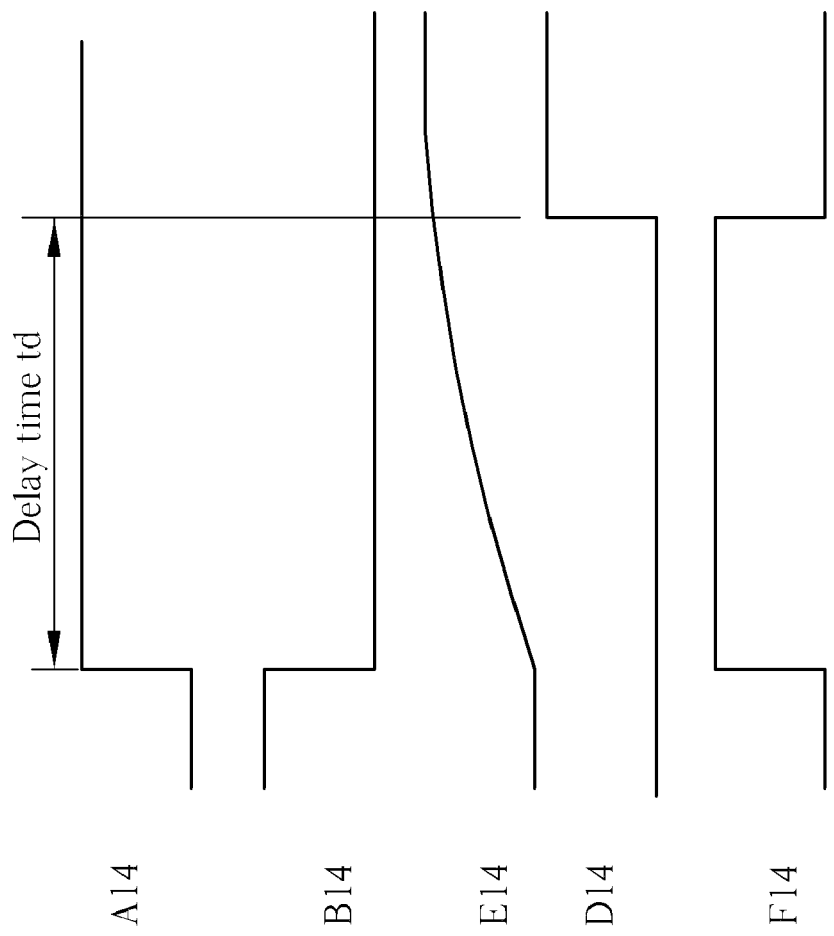
FIG. 16 is a waveform diagram of each node of the time limiter shown in FIG. 14 when the pulse width of a duty ratio of a periodic continuous input pulse is longer than a delay time.

Please refer to FIG. 16, which is a waveform diagram of each node of the time limiter 340 shown in FIG. 14 when the pulse width of the duty ratio tp of the periodic continuous input pulse is longer than a delay time td. As shown in FIG. 16, in single period of the periodic continuous input pulse, since the duty ratio tp is far longer than the delay time td, the discharging circuit 342 does not work during the single period until the voltage level at the node E14 exceeds the threshold of the active high Schmitt trigger 336. Then the voltage level at the output terminal of the active high Schmitt trigger 346 is changed from low to high, and the voltage level at the node D14 is thus changed from low to high. And the voltage level of the enabling signal at the node F14 is thus changed from high to low. In other words, as long as the delay time td can be properly modulated, the duty ratio of the light emitting diode 304 may thus be limited for preventing the light emitting diode 304 from being burnt down caused by working overtime, and the abovementioned phenomenon described with FIG. 13 is also prevented. The method for modulating the delay time td has already been described in detail, and further description is not given for the sake of brevity.

In FIG. 16, when the periodic continuous input pulse is continuously enabled because of run time errors, i.e. the duty ratio of the periodic continuous input pulse is continuously 100%, the duty ratio of the light emitting diode 304 is still limited by the delay time td from being burnt down.

Figure 17:
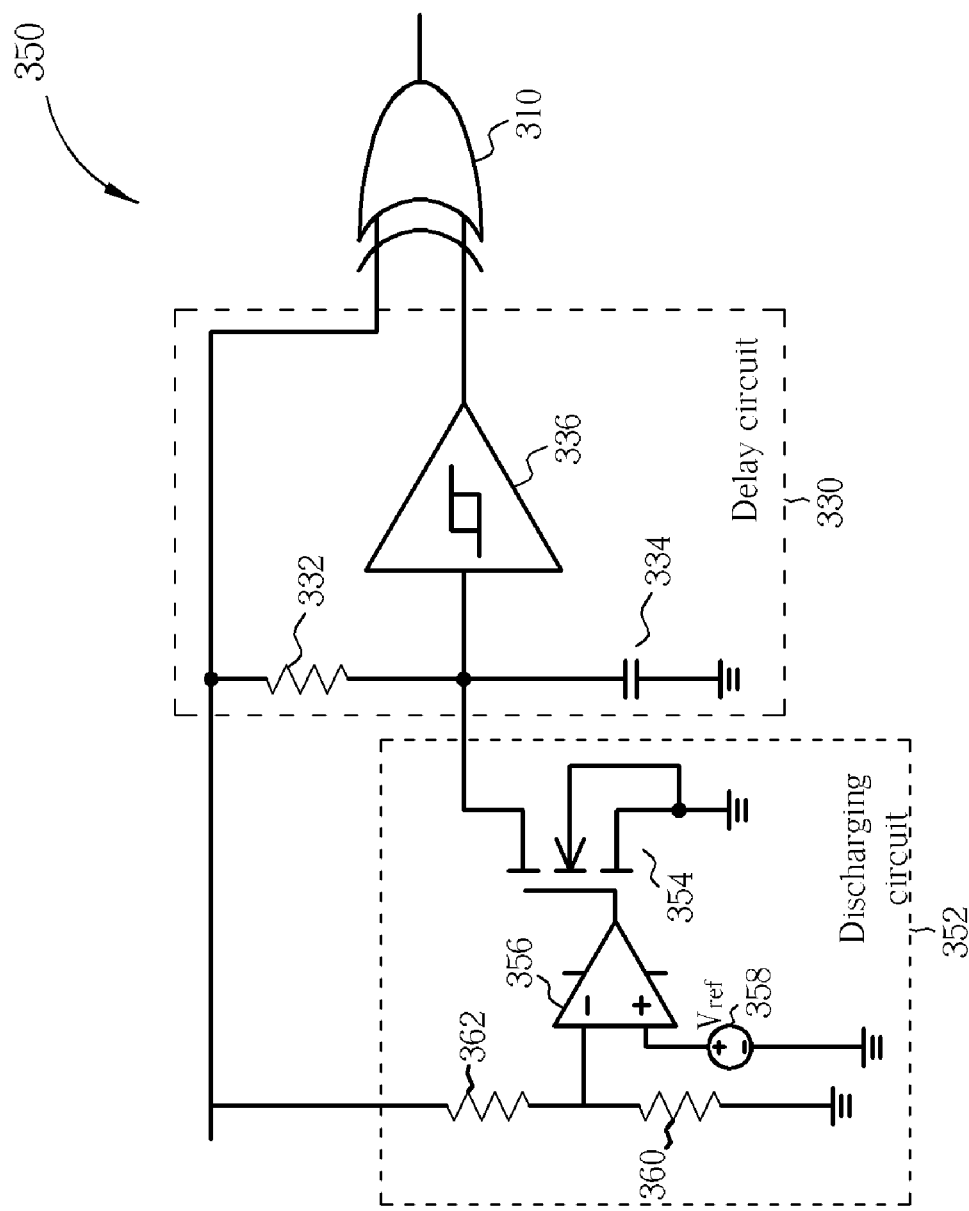
FIG. 17 is a diagram of a time limiter, which is a second improved embodiment of the time limiter shown in FIG. 12.

Please refer to FIG. 17, which is a diagram of a time limiter 350, which is a second improved embodiment of the time limiter 302 shown in FIG. 12. Similar to the time limiter 340, the time limiter 350 comprises all the elements of the time limiter 330, and further comprises a discharging circuit 352. The time limiter 350 is generated by parallel-connecting the discharging circuit 352 to the resistor 332 between the nodes A12 and E12 of the time limiter 330 shown in FIG. 12. The discharging circuit 352 comprises a transistor 354, a comparator 356, a reference voltage source 358, a first reference resistor 360, and a second reference resistor 362. The transistor 354 has a source coupled to ground, a base coupled to the source of the transistor 354, and a drain coupled to the first terminal of the resistor 332. An output terminal of the comparator 356 is coupled to the gate of the transistor 352. The reference voltage source 358 has a positive pole coupled to the first input terminal of the comparator 356, and a negative pole coupled to ground. The first reference resistor 360 has a first terminal coupled to the second input terminal of the comparator 356, and a second terminal coupled to ground. The second reference resistor 362 has a first terminal coupled to the second input terminal of the comparator 356, and a second terminal coupled to the second terminal of the resistor 332. A variable resistor is formed by the first reference resistor 360 and the second reference resistor 362.

Operations of the time limiter 350 are similar to the operations of the time limiter 340. However, the time limiter 350 further increases a discharging efficiency of the transistor 354 with the help of the comparator 356. Modulating the resistances of the first reference resistor 360 and the second reference resistor 362 may help modulate a threshold for starting discharging.

A time limiter is provided in the present invention for protecting a light emitting diode coupled to an output terminal of a current driver no matter whether a pulse width of an input pulse is larger or shorter than a delay time of a delay circuit. Therefore, a duty ratio of the light emitting diode would not be working overtime nor be burnt down by being overheated. The input pulse may be a period continuous input pulse having a frequent duty ratio, or be a continuously-enabled input pulse generated from run-time errors of software or hardware. When the pulse width of the input pulse is shorter than the delay time of the delay circuit of the time limiter of the present invention, the time limiter limits the duty ratio of the light emitting diode according to the pulse width of the input pulse for maintaining an original pulse width. When the pulse width of the input pulse is larger than the delay time of the delay circuit of the time limiter of the present invention, the time limiter limits the duty ratio of the light emitting diode according to the delay time of the delay circuit. Therefore, the duty ratio of the light emitting diode is thus effectively controlled from being burnt down by being overheated. Moreover, the time limiter of the present invention may properly discharge the capacitor of the delay circuit by coupling to a discharging circuit while a periodic continuous input pulse is inputted, for maintaining a precise period and a precise pulse width of an enabling signal for enabling a light emitting diode, and for preventing the light emitting diode from continuously working caused by run-time errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time-limiting protection and control circuit for protecting an element by limiting a pulse width of an input pulse, the time-limiting protection and control circuit comprising:
    an exclusive-OR gate (XOR gate) having a first input terminal and a second input terminal;
    a delay circuit having a first terminal coupled to the first input terminal of the exclusive-OR gate, and a second terminal coupled to the second input terminal of the exclusive-OR gate, wherein the delay circuit comprises:
an active high Schmitt trigger having an input terminal and an output terminal coupled to the first input terminal of the exclusive-OR gate; a first resistor having a first terminal coupled to the input terminal of the active high Schmitt trigger, and a second terminal coupled to the second input terminal of the exclusive-OR gate; and a capacitor having a first terminal coupled to the first terminal of the first resistor, and a second terminal coupled to ground; and a discharging circuit having a first terminal coupled to the input terminal of the delay circuit, and having a second terminal coupled to the second input terminal of the exclusive-OR gate.

2. The time-limiting protection and control circuit of claim 1 wherein the discharging circuit comprises:

a NAND gate having a first input terminal and a second input terminal, both of which being coupled to the second input terminal of the exclusive-OR gate; and a transistor having a drain coupled to the input terminal of the active high Schmitt trigger, a source coupled to ground, a base coupled to the source of the transistor, and a gate coupled to the output terminal of the NAND gate.

3. The time-limiting protection and control circuit of claim 2 wherein the transistor is an N-type metal oxide semiconductor transistor.

4. A time-limiting protection and control circuit for protecting an element by limiting a pulse width of an input pulse, the time-limiting protection and control circuit comprising:

an exclusive-OR gate (XOR gate) having a first input terminal and a second input terminal; a delay circuit having a first terminal coupled to the first input terminal of the exclusive-OR gate, and a second terminal coupled to the second input terminal of the exclusive-OR gate; and a discharging circuit having a first terminal coupled to the input terminal of the delay circuit, and having a second terminal coupled to the second input terminal of the exclusive-OR gate, wherein the discharging circuit comprises:

a comparator;

a reference voltage source coupled to a positive input terminal of the comparator;

a second resistor having a first terminal coupled to ground, and a second terminal coupled to a negative input terminal of the comparator;

a third resistor having a first terminal coupled to the negative input terminal of the comparator, and a second terminal coupled to the second input terminal of the exclusive-OR gate; and a transistor having a drain coupled to the input terminal of the delay circuit, a source coupled to ground, a base coupled to the source of the transistor, and a gate coupled to an output terminal of the comparator;

wherein a variable resistor includes the second resistor and the third resistor for modulating a threshold input voltage and for modulating a discharging rate.

5. The time-limiting protection and control circuit of claim 4 wherein the transistor is an N-type metal oxide semiconductor transistor.

* * * * *